United States Patent
Buzga

[11] 3,797,661
[45] Mar. 19, 1974

[54] METHOD AND APPARATUS FOR SEPARATING GRANULES FROM A LIQUID

[75] Inventor: Heinrich Buzga, Grevenbroich, Germany

[73] Assignee: Maschinenfabrick Burkau R. Wolf Aktiengesellschaft, Grevenbroich, Germany

[22] Filed: May 4, 1972

[21] Appl. No.: 250,270

[30] Foreign Application Priority Data
May 26, 1971 Germany............................ 2126069

[52] U.S. Cl................... 210/73, 34/570, 55/83, 55/205, 159/6, 210/180, 210/414
[51] Int. Cl............................................. B01d 29/40
[58] Field of Search ......... 210/71, 73, 78, 179, 180, 210/186, 218, 219, 413–416, 472; 55/85, 199, 205, 89; 34/8, 10, 11, 57 D, 57 E, 222, 229; 159/6

[56] References Cited
UNITED STATES PATENTS

| | | |
|---|---|---|
| 3,458,045 | 7/1969 | Dudley............................ 210/415 X |
| 3,188,942 | 6/1965 | Wandel............................ 210/415 X |
| 2,411,186 | 11/1946 | Boeckeler............................ 159/6 R |
| 2,995,246 | 8/1961 | Tittelboom...................... 209/305 X |
| 950,607 | 3/1910 | Baldwin................................. 55/89 |
| 1,675,200 | 6/1928 | Smith................................. 210/416 |

Primary Examiner—John Adee
Attorney, Agent, or Firm—Michael S. Striker

[57] ABSTRACT

Granules formed of a synthetic material by immersion in water, form a mixture with a large amount of water. The granules are separated from the water by a first stream of air produced by a rotary blower whose air stream presses the mixture against a sieve so that water is discharged through the sieve while the remaining wet granules are further transported by the stream of air along the sieve where remaining water is removed through the sieve while tangentially directed second air streams produced by a blower wheel transport the granules from the sieve to an outlet for the granules, and are discharged on the other side of the sieve through a gas outlet.

10 Claims, 2 Drawing Figures

METHOD AND APPARATUS FOR SEPARATING GRANULES FROM A LIQUID

BACKGROUND OF THE INVENTION

The present invention relates to a method and apparatus for removing water and drying granules consisting of a solid material, particularly a synthetic material granulated under water.

Material granulated under water forms a mixture with a great volume of water, so that the separation between the granules and the water causes great difficulties, particularly since the large amount of water requires large separating devices, for example, large swinging sieves.

SUMMARY OF THE INVENTION

It is one object of the invention to provide a compact apparatus which in a simple and efficient manner, separates water or any other liquid from granules without doing damage to the granules by mechanical engagement with moving transporting parts, while placing the granules in a condition suitable for storing and further use.

Another object of the invention is to provide a method by which the granules are reliably and quickly separated from the water of the mixture.

With these objects in view, a mixture of granules and water is separated along a stationary sieve by a large amount of pressure gas and the stream of the gas transports the granules along the sieve while passing through the sieve with removed water. The amount of pressure gas is greater than the amount of gas flowing through the free sieve surface in accordance with the prevailing gas pressure. In accordance with the method of the invention, the mixture of granules and water is pressed by pressure gas against the sieve so that upon placing of the mixture on one side of the sieve, the free water passes through the sieve. The still wet granules are pressed by the pressure gas moving at high speed against the sieve, so that water in the interstices between the granules is separated from the granules and pressed through the sieve with a part of the pressure gas. Since the pressure gas transmits to the granules on the sieve a component acting along the sieve, the granules are transported along the sieve while water films adhering to the granules are peeled off the granules and discharged through the sieve. Remaining moisture evaporates from the granules.

The method of the invention requires a comparatively small and compact apparatus for a quick separation of the water from the granules by means of a strong ventilation of the granules which are already partly separated from the water. In this manner, the granules are quickly placed in a condition for storing and further treatment, although the apparatus comprises only a few and simple parts.

It is advantageous to provide a source of vacuum, such as a pump at the outlet of the discharge space into which the water is pressed by the stream of air. By the suction pump, the pressure differential between opposite sides of the sieve is increased, so that more water is separated from the granules.

In accordance with another aspect of the invention, the gas water mixture forming in the discharge space after passing through the entrance portion of the sieve, is subjected to cold gas, while the granules in the last portion of the sieve, from which water is already partly removed, is subjected to hot gases so that evaporation of the moisture adhering to the granules is assured before the granules are discharged through the respective outlet. The cold and hot streams of gases can be blown by nozzles in a direction toward the sieve wall onto the mixture of granules and water.

In order to improve the economy of the arrangement, the pressure gas passing through the sieve, and the water passing through the sieve, are separately collected, and after passing through the outlet of the casing separately treated for recirculation. It is particularly advantageous, if cold gas is discharged together with the excess of water passing through the sieve into the discharge space, while the hot gases are separately discharged through a gas outlet. In this manner, the reuse of pressure gas and water is simplified.

In an apparatus according to the invention, a rotary blower wheel is mounted between two parallel walls, one of which has a gas inlet for the blower, while a curved sieve wall partly surrounds the blower wheel. The sieve wall is interrupted by the inlet for the mixture of granules and water and by the outlet for the discharge of the dried granules, suitable connecting flanges being provided. The use of a rotary blower results in a rotating stream of gas so that separation of water is improved, and a great transporting component of the air stream is obtained. In order to obtain a large amount of gas which can be blown against the mixture of granules and water on the sieve, the connecting flanges for the inlet of the mixture and the discharge of the dried granules, are spaced from each other along the periphery of the blower wheel, and connected by a guide wall whose distance from the periphery of the blower wheel increases in the direction of rotation.

For reducing energy requirements in the generation of pressure gas, the curved sieve, with the exception of the inlet and outlet flanges, is enveloped in a closed casing.

In accordance with another feature of the invention, the distance between a curved wall of the casing and the sieve wall gradually increases in the forward region of the sieve wall, so that a discharge space is formed, ending in a water chamber provided with a discharge outlet tube which is arranged spaced a small distance from the sieve. In this manner, a spatial separation between the moist pressure gas in the first portion of the discharge space, and the hot gases in the second portion of the discharge space, is obtained.

In order to obtain uniform flow conditions, a curved wall portion surrounds the end portion of the sieve, at a gradually increasing distance toward the gas outlet. This curved wall follows directly the constriction formed by a portion of the water discharge outlet.

It is an important feature of the invention that the granules are transported by means of a stream of gas, such as air, along the sieve toward outlet means. In order to obtain a slight impact effect, and thereby high relative acceleration and even transverse ventilation, the present invention provides stationary guide vanes between the blower wheel and the curved sieve wall, which are preferably disposed to produce a tangential component of the gas stream.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic cross-sectional view taken on line I—I in FIG. 2; an

DESCRIPTION OF THE PREFERRED EMBODIMENTS

Figure 1:
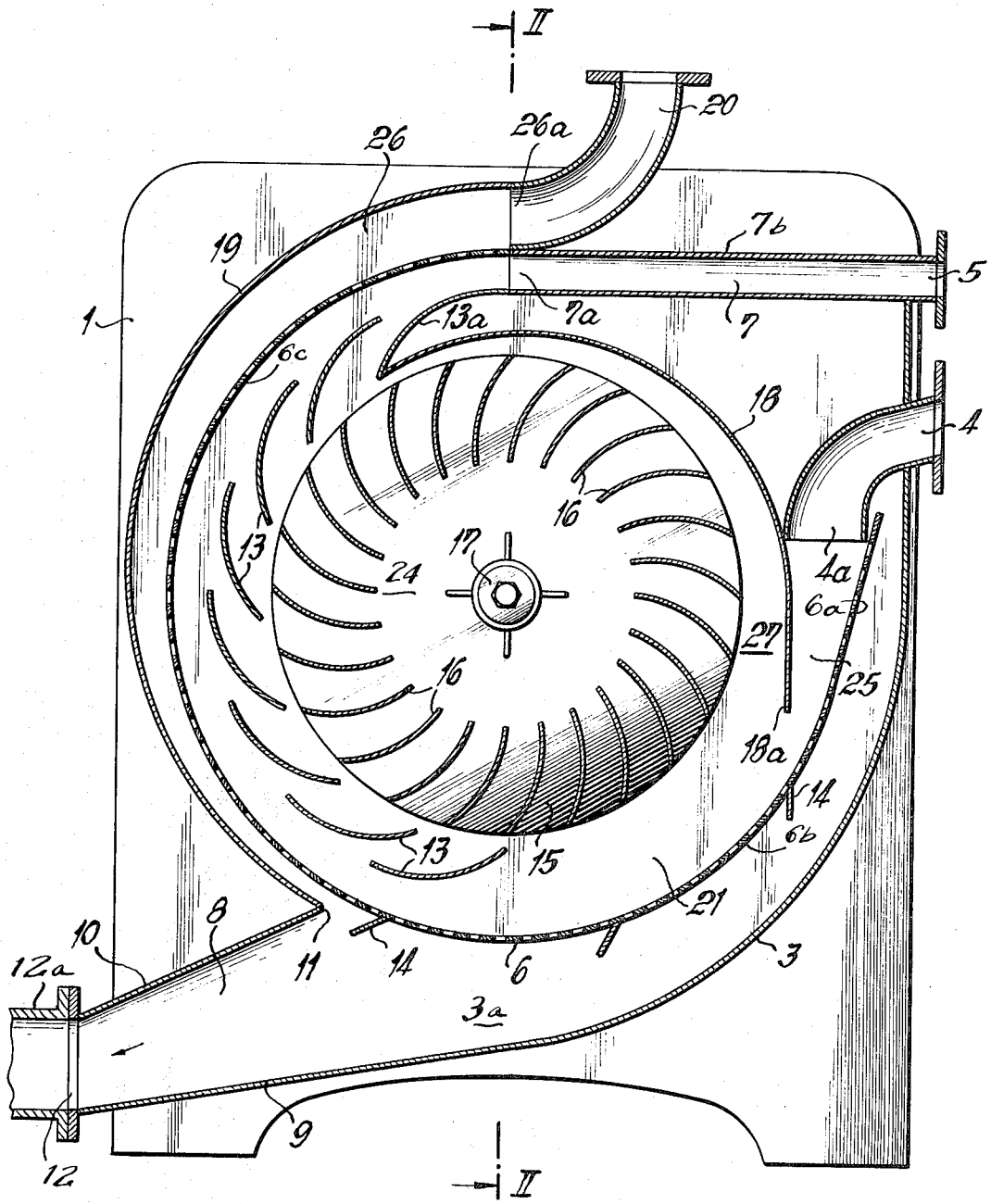
Figure 2:
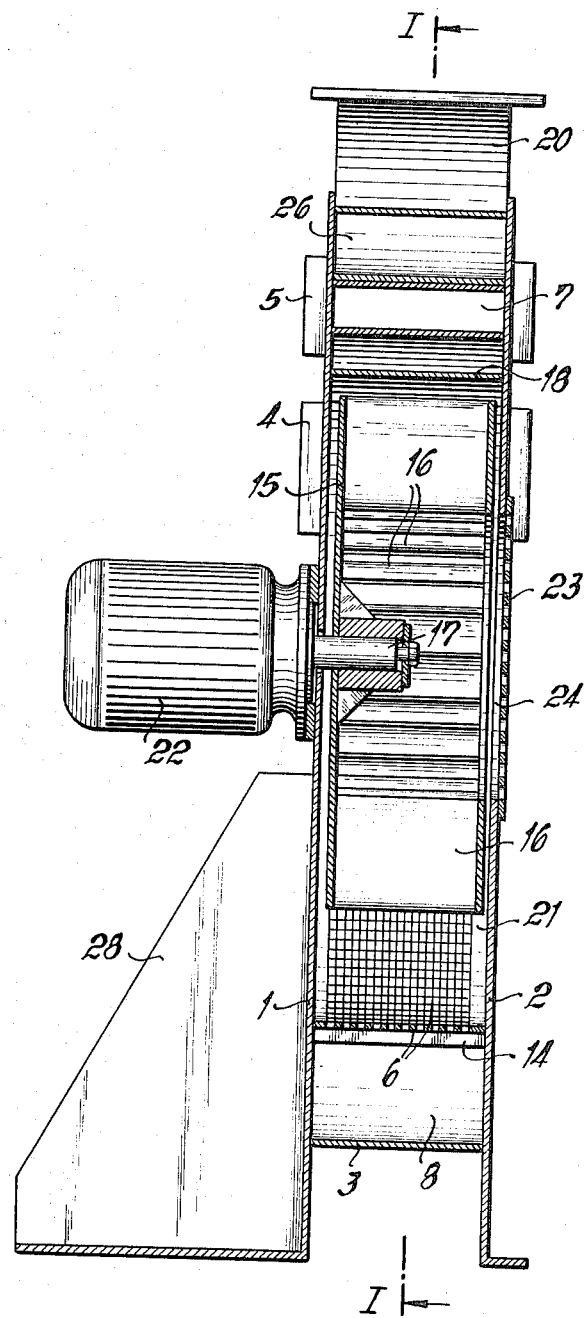
FIG. 2 is a schematic sectional view taken on line II—II in FIG. 1.

Two planar parallel side walls 1 and 2 have at the bottom ends, transverse portions serving as legs, and a supporting bracket 28. Between the lateral walls 1 and 2, a curved casing wall 3 is disposed, which is fixedly connected with the lateral walls 1 and 2. Above the casing wall 3, an inlet flange 4 for a mixture of granules and water, and an outlet flange 5 for dried granules are provided which pass through corresponding openings in casing wall 3. Below the opening 4a of the inlet 4, a curved sieve wall 6 is mounted between the lateral walls 1 and 2, the sieve wall 6 having a planar entrance portion 6a, followed by a curved sieve portion 6b which merges into the top wall portion 7b of an outlet channel 7 which ends in the outlet flange 5 through which the separated and dried granules are discharged. The curved casing wall portion 3 ends in a planar bottom wall 9 which, together with an upper casing wall portion 10, forms a water space 8 ending in the outlet flange 12. The water space 8 is the lowest part of a discharge space 3a between the sieve wall 6 and the casing wall 3. As schematically indicated by a flange 12a, a source of vacuum, such as a suction pump, can be connected with the outlet 12 in order to accelerate the discharge of water and moist air from the discharge space 3a. A regulating device, not shown, may be secured to the outlet flange 12 which prevents the total escape of air passing through the sieve wall 6 into the discharge space 3a.

Below the sieve wall 6, guide projections 14 are disposed which have the effect that water passing through the sieve wall 6 is separated from the sieve and discharged into the discharge space 3a and from there into the water space 8. Without the guide projections 14, part of the water may adhere to the side of the sieve confronting the casing wall 3, and remain on the sieve wall.

The curved part-circular sieve wall 6 surrounds a peripheral portion of a blower wheel 15 which has blower vanes 15 forming nozzles, and is mounted with shaft 17 in a motor 22 supported on lateral wall 1. The blower wheel 15 is arranged so that a separating chamber 21 is formed between part of the periphery of blower wheel 15 and the part-circular sieve wall 6. Several guide vanes 13 are mounted on the lateral wall along the left peripheral portion of the blower wheel 15, as viewed in FIG. 1.

In the region between the inlet conduit 4a and the outlet conduit 7, 7a, a guide wall 18 is provided which forms a pressure gas conduit 27 with another peripheral portion of the blower wheel 15, the pressure gas conduit 27 having a gradually increasing cross-section, and being widest in the region of the wall portion 18a which separates the gas outlet channel 27 from the narrowing inlet conduit 4a of the inlet 4 of the mixture of granules and water. The uppermost and last stationary guide vane 13a is connected with the guide wall 18 and with the lower wall of the outlet conduit 7 for granules. The portion 18a, at the other end of the guide wall 18 separates the inlet conduit 4a, 25 from the outlet portion of the gas conduit 27. Due to the fact that the conduit portion 25 is narrower than the inlet conduit 4a, excess water entering through the inlet 4 together with granules, is immediately pressed through the sieve portion 6a into the first part of the discharge space 3a. A curved wall portion 19 starts at the edge 11 of the wall 10 of the discharge space 3a, and forms a casing wall outwardly of the sieve portion 6c. The distance between casing wall 19 and sieve wall portion 6c gradually increases, forming at the upper end a gas outlet channel 26 merging into the gas outlet 20 which has the same cross-section 26a as the end of the gas outlet channel 26. A purifying device, not shown, is connected to the gas outlet 20 for cleaning the discharged gas, such as air, so that the gas or air can be recirculated in the apparatus.

The lateral wall 2 has an inlet opening 24 through which air can enter the inner space of the blower wheel inward of the inner ends of the blower vanes 16 so as to driven by the centrifugal force between the vanes 16 into the separating chamber 21. The inlet opening 24 is preferably covered by a filter 23.

The guide wall 18 combines the air streams discharged from the blower wheel 15 on the right side of FIG. 1, and directs a stream of air at an angle onto one side of sieve wall 6 so that one component presses water entering through inlet 4 and passing through inlet conduit 25, through the sieve portion 6b, while a component parallel to the sieve portion 6b urges the granules and adhering water to move along the sieve. In the left portion of the blower wheel 15, the guide vanes 13 deflect streams of air into a tangential direction, substantially parallel with the sieve portion 6c.

The above-described apparatus operates as follows. A mixture of granules and water is admitted through the inlet 4 and passes through inlet conduit 4a and a narrowing portion 25 so that the excess water is guided by the straight guide wall portion 18a through the sieve entrance portion 6a, passes into the corresponding portion of the discharge space 3a, and flows toward the water chamber 8. The wet granules slide due to the action of gravity along the sieve portion 6a onto the sieve portion 6b where they are impinged by a first component of a strong stream of air produced by the blower wheel 15 and combined in the pressure gas conduit 27. Due to the great amount of pressure gas impinging the granules, the granules are pressed against the sieve portion 6b, and the water passes through the sieve portion 6b into the discharge space, together with a part of the air stream. Water and moist air is collected in the water chamber 8 and discharged through discharge flange 12 where the air and water may be separated, purified, and reintroduced into circulation. Such a device, not shown, may follow a vacuum pump whose inlet flange 12a is secured to outlet flange 12.

The stream of air produced by blower vanes 16 is slanted to the side or surface of the sieve 6 on which the wet granules are placed, and has a second component stream flowing along the sieve portion 6b and transporting the wet granules into the region of the sieve portion 6c where the stationary guide vanes 13 are disposed. In this region bc, the water adhering to the granules, and located in the interstices between the granules, is also separated from the air, while the granules remain on the inner surface of the sieve portion 6c. Water flows back from the space between casing wall 19 and sieve portion 6c into the discharge space 3a and water chamber 8 for discharge through outlet 12.

In the portion 21a of the separating channel 21, the granules are thrown lightly against the guide vanes 13, so that the granules bounce back against the sieve 6 due to the curved shape of the guide vanes 13. During movement of the granules from the guide vanes 13 to the sieve wall 6, transverse ventilation takes place because the rotating stream of gas retains its direction along the sieve wall 6. In addition to the light impact effect, a high relative speed between the granules and the pressure gas stream develops. The impact effect and the transverse air stream assure a tearing off of the adhering water films, which together with the air, pass through the sieve 6 and enter the gas outlet channel 26 to be discharged through gas outlet 20.

The blower wheel 15 with its inlet opening 24 is preferably so constructed that in the upper portion, in the region of the upper guide vanes 13, hot air is blown against the granules, which assures evaporation of moisture adhering to the granules. The dried granules flow with a portion of the hot air through the outlet channel 7 to the outlet flange 5 for granules, and from there to other apparatus for further treatment, not shown. Remaining moisture passing through sieve 6 in the region of the gas outlet channel 26 is discharged, together with the pressure gas through the gas outlet 20.

In a modification, the sieve 6 may be constructed as a plate, and the pressure gas is blown by slanted nozzles onto the sieve so that, as described above, the water is pressed through the sieve, while a component of the air streams from the nozzles transports the granules on the sieve.

It will be understood that each of the elements described above, or two or more together, may also find a useful application in other types of a method for separating granules from a liquid differing from the types described above.

While the invention has been illustrated and described as embodied in an apparatus for separating granules consisting of a synthetic material from water by means of air streams slanted to a sieve on which the mixture of granules and water is moved, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Method of separating granules from a liquid, comprising placing a mixture of granules and of a liquid on one side of a stationary sieve; blowing a stream of gas slanted to said one side of said sieve against said sieve and the mixture thereon so that a first component of said gas stream passes through said mixture and said sieve, while a second component of said slanted gas stream flows along said one side of said sieve and transports said granules with liquid adhering thereto along said one side of said sieve on a separating sieve portion so that said liquid adhering to said transported granules is blown by said first stream component through said separating sieve portion into a discharge space while granules freed of liquid are transported by said second stream component on said one side of said separating sieve portion to an outlet for granules; and discharging on the other side of said separating sieve portion, gas passing through said separating sieve portion.

2. The method of claim 1 wherein said mixture is placed on a downward slanted entrance portion of said sieve so that free water flows through said entrance portion into said discharge space by the action of gravity, the remaining mixture moving down to a second sieve portion following said entrance portion and being impinged by said stream of gas at such an angle that said first component of said stream pushes liquid in the interstices between said granules through said sieve, and said second component of said stream acts along said sieve to transport the moist granules along said sieve to said separating sieve portion.

3. The method of claim 1 comprising the step of applying suction to said discharge space whereby the pressure differential between said one side and said other side of said sieve is increased for rapidly moving the liquid through said sieve.

4. The method of claim 1 comprising separately treating said liquid and said gas after passage through said sieve; and recirculating said liquid and said gas.

5. Apparatus for separating granules from a liquid, comprising a casing having an inlet opening for gas; blower means mounted in said casing for drawing gas through said inlet opening and for discharging a stream of gas; stationary sieve means extending along said blower means at an angle to said stream of gas, and forming with the same a separating chamber having at one end an inlet for placing a mixture of granules and a liquid on one side of said sieve means, said one side being slanted at said angle to said streams of gas, said separating chamber having at the other end an outlet for granules; said casing including wall means surrounding said sieve means and forming with an end portion of said sieve means a discharge space having a discharge outlet for liquid and gas blown through said sieve portion, and forming with another end portion of said sieve means a gas outlet for gas flowing through said other end portion of said sieve means; said streams of gas having a first stream component transverse to said sieve means so that liquid is pressed to the other side of said sieve means while said mixture remains on said one side of said sieve means, and a second stream component flowing along said one side for transporting said mixture on said stationary sieve means.

6. Apparatus as claimed in claim 5 comprising a guide wall mounted in said housing along an other peripheral portion of said blower wheel between said inlet for said mixture and said outlet for said granules, said guide wall being spaced a gradually increasing distance from said other peripheral portion of said blower wheel for guiding air streams discharged at said other peripheral portion into said one end of said separating chamber adjacent said inlet for said mixture.

7. Apparatus as claimed in claim 6 wherein said wall means has a gradually increasing distance from said one end portion of said sieve means so that the flow cross section of said discharge space gradually increases toward said discharge outlet, and being spaced a short distance from the portion of said sieve means following said one end portion so that a constriction is formed in said discharge space between said one end portion and said other end portion of said sieve means.

8. Apparatus as claimed in claim 5 comprising guide vanes secured to said casing and located in said separating chamber along said peripheral portion of said blower wheel, and along said other end portion of said sieve means for guiding streams of gas through said other end portion of said sieve means to said gas outlet.

9. Apparatus as claimed in claim 8 wherein said guide vanes are curved so that said gas streams have components tangential to said blower means and substantially parallel to said other end portion of said sieve means.

10. Apparatus for separating granules from a liquid, comprising a casing having an inlet opening for a gas; a rotary blower wheel mounted in said casing for drawing gas through said inlet opening and for discharging streams of gas on the periphery thereof; sieve means extending along a peripheral portion of said blower wheel and forming with the same a separating chamber having at one end an inlet for a mixture of liquid and granules, and at the other end an outlet for granules; said casing including wall means surrounding said sieve means and forming with one end portion of said sieve means a discharge space having a discharge outlet for liquid and for gas blown through said one end portion, and forming with the other end portion of said sieve means a gas outlet for gas flowing through said other end portion of said sieve means; comprising a guide wall mounted in said housing along another peripheral portion of said blower wheel between said inlet for said mixture and said outlet for said granules, said guide wall being spaced a gradually increasing distance from said other peripheral portion of said blower wheel for guiding air streams discharged at said other peripheral portion into said one end of said separating chamber adjacent said inlet for said mixture, said wall means having a gradually increasing distance from said one end portion of said sieve means so that the flow cross-section of said discharge space gradually increases toward said discharge outlet, and being spaced a short distance from the portion of said sieve means following said one end portion so that a constriction is formed in said discharge space between said one end portion and said other end portion of said sieve means, said wall means including a curved wall following said constriction and ending at said gas outlet, said curved wall being spaced from said other end portion of said sieve means a gradually increasing distance corresponding to the width of said gas outlet.

* * * * *